United States Patent [19]

Sakamura et al.

[11] Patent Number: 5,121,474
[45] Date of Patent: Jun. 9, 1992

[54] BIT STRING DATA PROCESSOR USING DYNAMICALLY ADDRESSABLE BIT LOCATIONS IN MEMORY SO OVERLAPPING STRINGS DO NOT DESTROY DATA IN MEMORY

[75] Inventors: Ken Sakamura, Tokyo; Toru Shimizu, Itami; Shunichi Iwata, Itami; Tatsuya Enomoto, Itami, all of Japan

[73] Assignee: Mitsubishi Denki Kabushiki Kaisha, Tokyo, Japan

[21] Appl. No.: 677,363

[22] Filed: Mar. 26, 1991

Related U.S. Application Data

[63] Continuation of Ser. No. 172,041, Mar. 23, 1988, abandoned.

[30] Foreign Application Priority Data

Sep. 30, 1987 [JP] Japan .................... 62-246627

[51] Int. Cl.⁵ .............. G06F 9/305; G06F 9/308
[52] U.S. Cl. .................... 395/800; 364/259; 364/259.8; 364/DIG. 1

[58] Field of Search ... 364/200 MS File, 900 MS File

[56] References Cited

U.S. PATENT DOCUMENTS

| 4,099,229 | 7/1978 | Kancler | 364/200 |
|---|---|---|---|
| 4,109,310 | 8/1978 | England et al. | 364/200 |
| 4,219,874 | 8/1980 | Gusev et al. | 364/200 |
| 4,258,419 | 3/1981 | Blahut et al. | 364/200 |
| 4,367,524 | 1/1983 | Budde et al. | 364/200 |

Primary Examiner—Thomas C. Lee
Assistant Examiner—Robert B. Harrell
Attorney, Agent, or Firm—Townsend and Townsend

[57] ABSTRACT

A data processor in accordance with the present invention can normally operate bit-string data while avoiding a breakage of the data even in the case where a read-out area of the bit string and a write-in area thereof are overlapped by each other by providing an operation code of an instruction with an option designating the direction of bit processing.

18 Claims, 11 Drawing Sheets

T ← mem (SA)  (READ OUT 1 WORD=4 BYTES)
SA ← SA+4

BIT STRING OF BIT NUMBER S0 TO S0+Δ-1 IS
EXTRACTED FROM BIT STRING OF 2 WORDS (NAMED 'S:T')
OBTAINED BY COUPLING S AND T AND IS SET AS X

BIT STRING OF BIT NUMBER D0 TO D0+Δ-1 IS EXTRACTED
FROM D AND IS SET AS Y

RESULT OF LOGICAL OPERATION OF X AND Y DESIGNATED
BY R5 IS SET AS Z

BIT STRING Z OF Δ LENGTH IS INSERTED
INTO BIT NUMBER D0 TO D0+Δ-1 IN D mem (DA) ← D  (WRITE IN 1 WORD=4 BYTES)
DA ← DA+4

T←mem(SA)  (READ OUT 1 WORD=4 BYTES)
SA←SA-4

BIT STRING OF BIT NUMBER SO-△+32 TO 32+SO-1 IS
EXTRACTED FROM BIT STRING OF 2 WORDS (NAMED 'T;S')
OBTAINED BY COUPLING T AND S AND IS SET AS X

BIT STRING OF BIT NUMBER DO-△ TO DO-1 IS EXTRACTED
FROM D AND IS SET AS Y

RESULT OF LOGICAL OPERATION OF X AND Y DESIGNATED
BY R5 IS SET AS Z

BIT STRING Z OF △ LENGTH IS INSERTED
INTO BIT NUMBER DO-△ TO DO-1 IN D mem(DA)←D  (WRITE IN 1 WORD=4 BYTES)
DA←DA-4

S←T

SO←SO-△+32
DO←32

(d)

BIT STRING DATA PROCESSOR USING DYNAMICALLY ADDRESSABLE BIT LOCATIONS IN MEMORY SO OVERLAPPING STRINGS DO NOT DESTROY DATA IN MEMORY

This is a continuation of Ser. No. 07/172,041, filed Mar. 23, 1988, now abandoned.

BACKGROUND OF THE INVENTION

1. Field of the Invention

The present invention relates to a data processor which is constituted a manner capable of operating a bit field having an arbitrary length.

2. Description of the Prior Art

The conventional data processors such as microprocessors realize operation of a bit field having an arbitrary length by repeating execution of an instruction of performing operation on a bit field of a fixed length, or in the case of not having such instruction, by combining an instruction of performing operation on a byte basis with an instruction of performing operation on a bit basis.

In the conventional data processors, in the case where a read-out area of a bit string and a write-in area thereof are overlapped each other for instructions of performing read-out and write-in of the bit string, for example an instruction for moving bit-string data in a memory, bit data read in the second half might be broken in writing the bit data in the first half.

Also, in the conventional data processors, a problem exists that in the case where the length of the bit string is arbitrary, the execution time of an instruction of operating the bit string becomes long in proportion to the length of the bit string, resulting in a break of reception of external interrupt up to the end of execution of the instruction.

SUMMARY OF THE INVENTION

The present invention purposes to provide a data processor capable of solving the problem as described above.

A data processor in accordance with the present invention is constituted in a manner capable of performing a correct operation of bit string data while avoiding a breakage of the data even in the case where a read-out area of the bit string and a write-in area thereof are overlapped each other by giving an option of designating the direction of bit processing to an operation code of an instruction.

In the data processor in accordance with the present invention, such a configuration allows quick acceptance of an external interrupt by enabling a break and re-start of execution processing of an instruction of operating a bit string. Also, the progress status of operation of the bit string by the instruction is represented by update of an operand in a register designating the bit string to be operated, thereby re-start of execution of the instruction is processed likewise start of the same.

Furthermore, the capacity of a bus can be utilized to a maximum extent by executing the processing of bit string in matching with the alignment of the bus.

The above and further objects and features of the invention will more fully be apparent from the following detailed description with accompanying drawings.

BRIEF DESCRIPTION OF THE DRAWINGS

FIGS. 6, 7, 8, 9, 10 and 11 are flowcharts showing execution sequences in executing the BVMAP instruction by control of a microprogram stored in a micro ROM, and among them, FIGS. 6, 7, and 8 are also flowcharts in the case of proceeding processing of a bit field in the direction of increasing side in the bit number, FIGS. 9, 10, and 11 are also flowcharts in the case of proceeding processing of the bit field in the direction of decreasing side in the bit number.

DESCRIPTION OF THE PREFERRED EMBODIMENTS

Hereinafter, description will be given an embodiment in accordance with the present invention in reference to the drawings.

Figure 1:
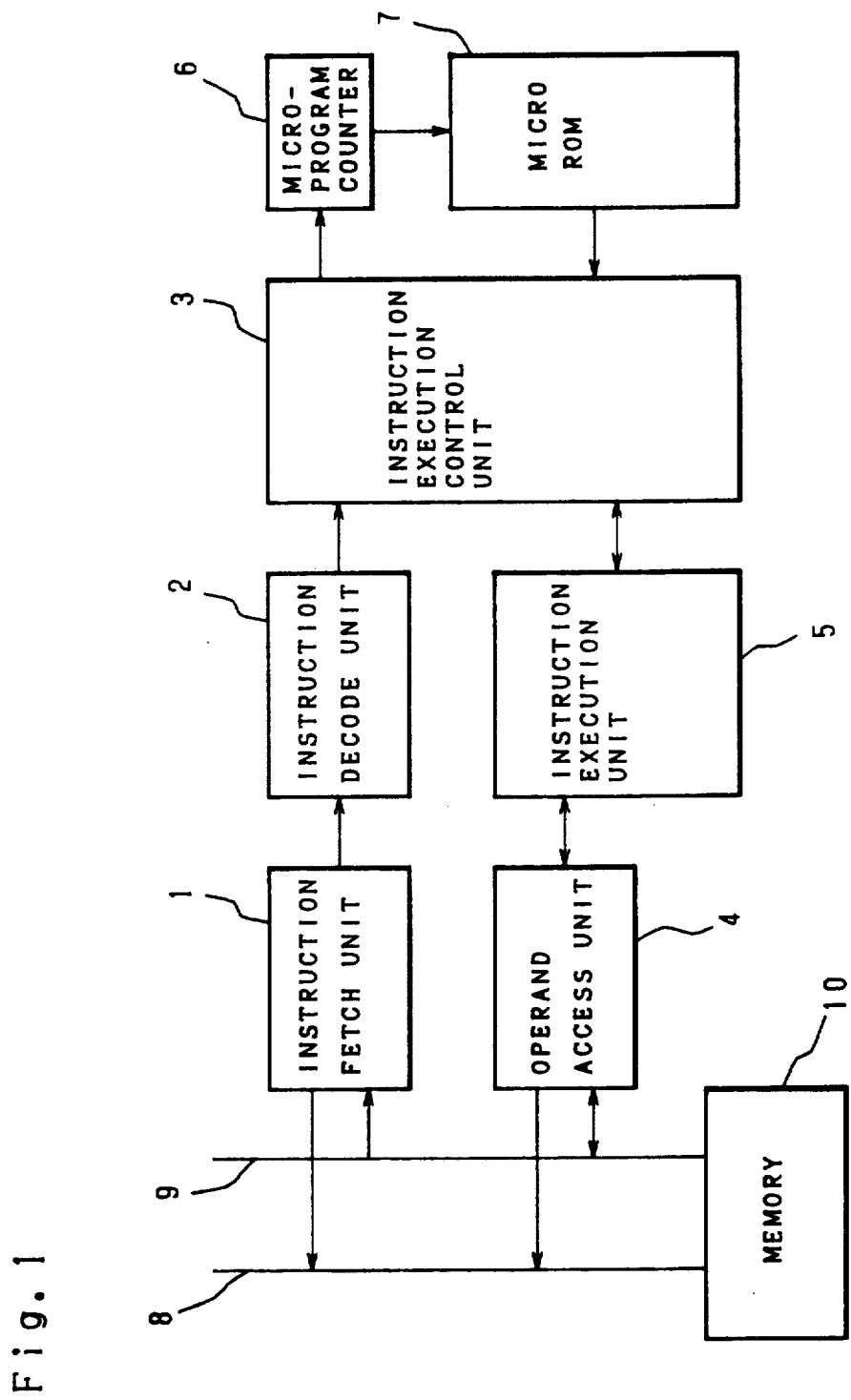
FIG. 1 is a block diagram showing one example of the whole configuration of a data processor in accordance with the present invention.

FIG. 1 is a view showing the whole configuration of a data processor in accordance with the present invention.

In FIG. 1, numeral 1 designates an instruction fetch unit which sends addresses to a memory 10 through an address bus 8, and fetches instructions from the memory 10 through a data bus 9.

Numeral 2 designates an instruction decode unit which receives instructions from the instruction fetch unit 1, decodes it, and outputs information required for executing that instruction.

Numeral 3 designates an instruction execution control unit which outputs microprogram entry address stored in a micro ROM 7 and showing the head address of a microprogram executing the instruction to a counter 6 based on the microprogram entry address or information such as general purpose register number, operands and data sizes outputted from the instruction decode unit 2, and controls an instruction execution unit 5 by micro instructions outputted form the micro ROM 7 by addresses designated one after another by the microprogram counter 6 and by other information outputted from the instruction decode unit 2 and thereby executing an instruction.

Numeral 4 designates an operand accesss unit which, in the case where an operand required in executing an instruction exists in a memory 10, outputs the address thereof to the address but 8 and fetches the operand through the data bus 9, or in the case where an operand is required to be stored in the memory 10, outputs the address thereof to the address bus 8, and outputs the operand to the data bus 9.

Figure 2:
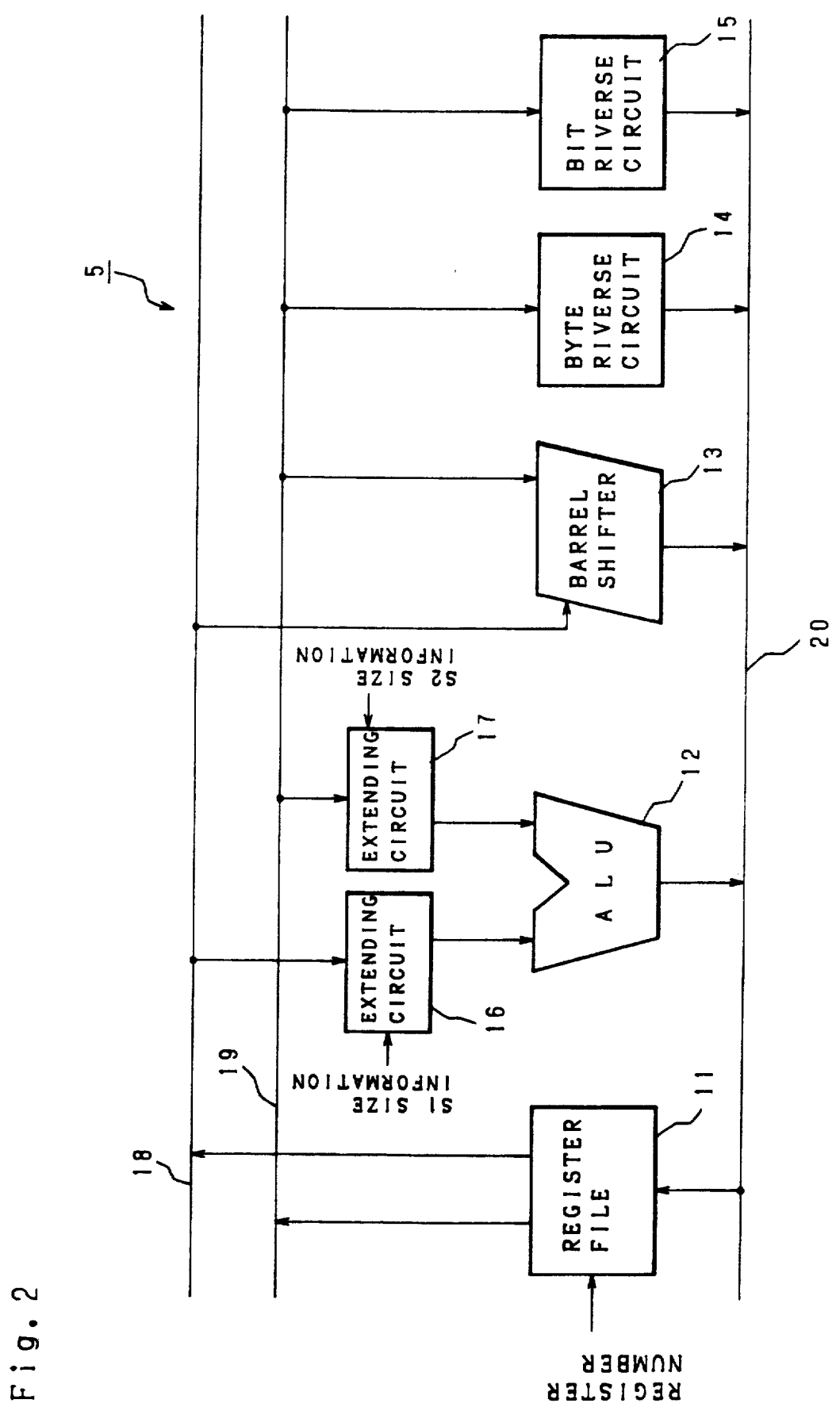
FIG. 2 is a block diagram showing a detailed configuration of an instruction execution unit.

FIG. 2 is a block diagram showing the detail of the instruction execution unit 5 in FIG. 1.

Numeral 11 designates a register file storing data as an operand.

Numerals 12, 13, 14 and 15 designate arithmetic units, respectively. In addition, numeral 12 designates an ALU executing arithmetic operation such as addition of two binary numbers and logical operation such as logical AND of two bit fields.

Numerals 16 and 17 designate extension circuits which, in inputting data having a data size smaller than that of the ALU 12, perform zero extension or signed extension of the size thereof to a data size handled by the ALU 12.

Numeral 13 designates a barrel shifter for shifting data right or left or a plurality of bit at one operation.

Numeral 14 designates a byte reverse circuit for reversing the byte order of a byte string, and numberal 15 designates a bit reverse circuit for reversing the bit order of a bit string.

Numerals 18, 19 and 20 designate buses for linking the register file 11 with the arithmetic units 12, 13, 14 and 15.

The register file 11 is linked in a 32-bit parallel fashion with the arithmetic units 12, 13, 14 and 15 such as the ALU 12. In addition, the bit store position of the register 11 and the input output bit position of the ALU 12 are in a corresponding to one-to-one.

Hereinafter, description will be given on operation of such an apparatus of the present invention.

In addition, description on the detail of instructions that the data processor of the present invention as described above executes under control of microprograms stored in the micro ROM 7 is made in the Japanese Patent Application No. 62-247418 (1987), titled "Data Processor", applied by one of the present inventors.

Hereinafter, description will be given on specifically on operation of an instruction called BVMAP instruction, which operates a bit field having an arbitrary bit length.

Figures 3, 4:
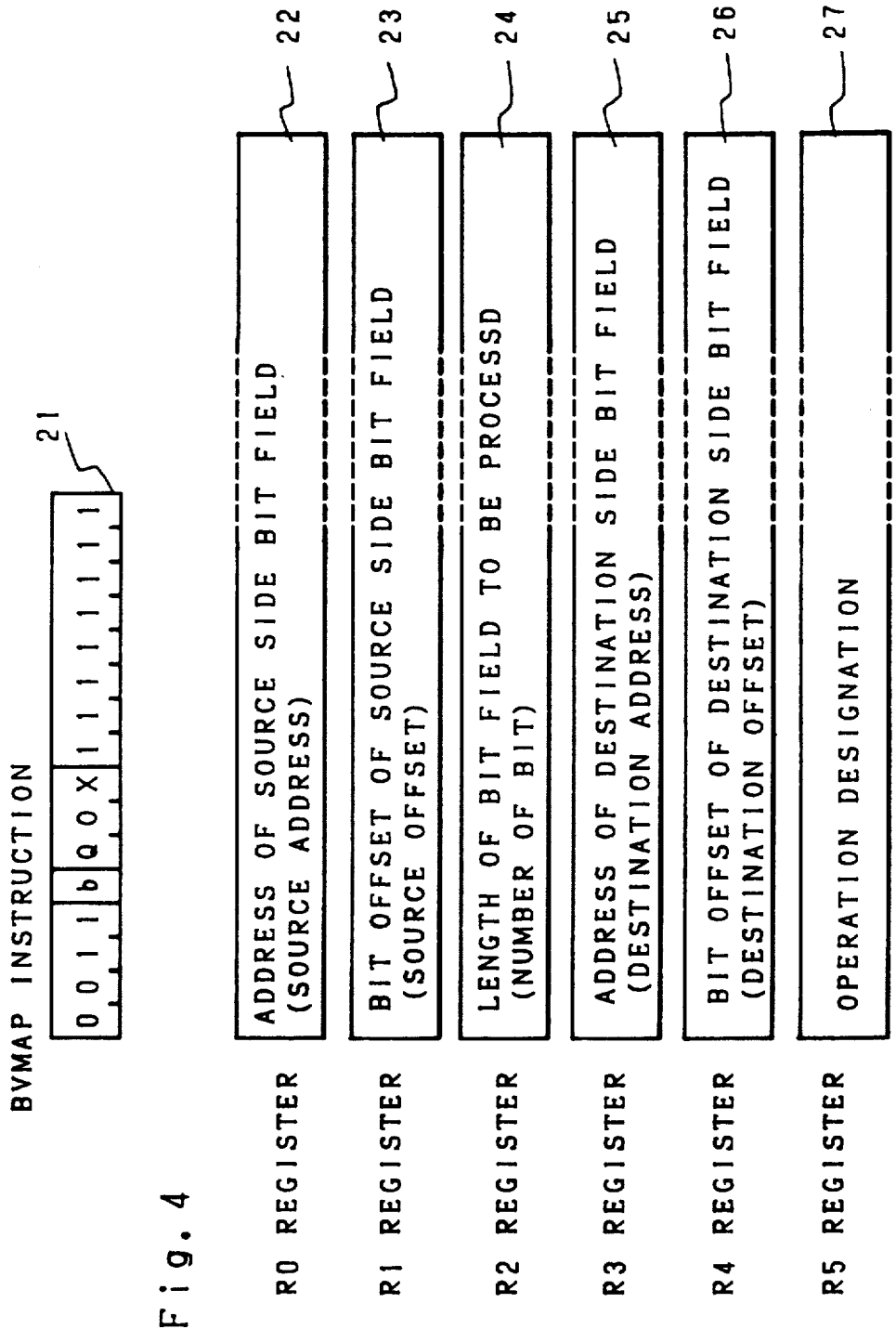
FIG. 3 is a schematic diagram showing an operation code of a BVMAP instruction.
FIG. 4 is a schematic diagram showing an operand of the BVMAP instruction.

FIG. 3 is a schematic diagram representing an operation code of the BVMAP instruction.

In this diagram, b bit 21 designates processing of a bit field to proceed in the direct increasing the bit number where b=0, and designates processing of the bit field to proceed in the direction of decreasing the bit numer where b=1.

FIG. 4 is a schematic diagram showing an operand of the BVMAP instruction.

The operand of the BVMAP instruction is stored in an RO register 22, an R1 register 23, an R2 register 24, an R3 register 25, an R4 register 26 and an R5 register 27 which are for general purpose and are provided in the register file 11.

An address as a base of a bit field of the source side (herinafter referred to as source address) is put in the RO register 22, a bit offset of the bit field of the source side (hereinafter referred to as source offset) is put in the R1 register 23, a value showing the length of a bit field to be processed (hereinafter referred to as the number of bit) is put in the R2 register 24, an address as a base of a bit field of the destination side (hereinafter referred to as destination address) is put in the R3 register 25, and a bit offset of the bit field of the destination side (hereinafter referred to as destination offset) is put in the R4 register 26, respectively.

Then, the kind of logical operation between the bit field of the source side and that of the destination side is dedsignated by the R5 register 27.

Figure 5:
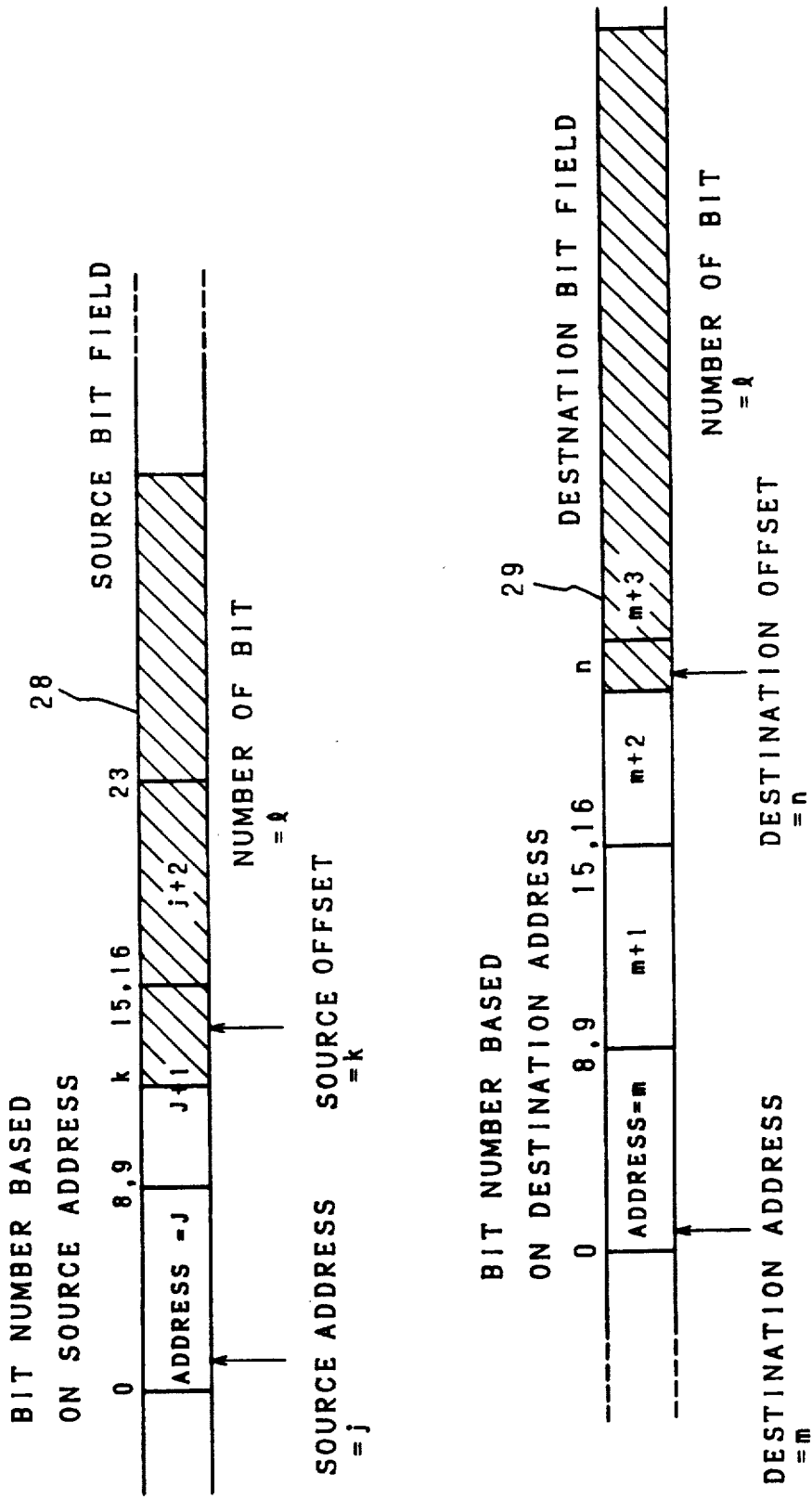
FIG. 5 is an explanatory view of a bit field.

FIG. 5 is a schematic diagram explaining a configuration of a bit field.

A source bit field 28 is designated by a source address (=j), a source offset (=k) indicating the number of bits apart from the most significant bit of the source address to the most significant bit of the source bit field 28, and the number of bits (=l) indicating the number of bits of the source bit field 28 (common with the number of bits of the destination bit field).

Likewise, a destination bit field 29 is designating also by the destination address, the destination offset and the number of bits.

FIG. 6 through FIG. 11 are flowcharts showing executing sequences in the case of executing the BVMAP instruction under control of a microprogram stored in the micro ROM 7.

Figure 6:
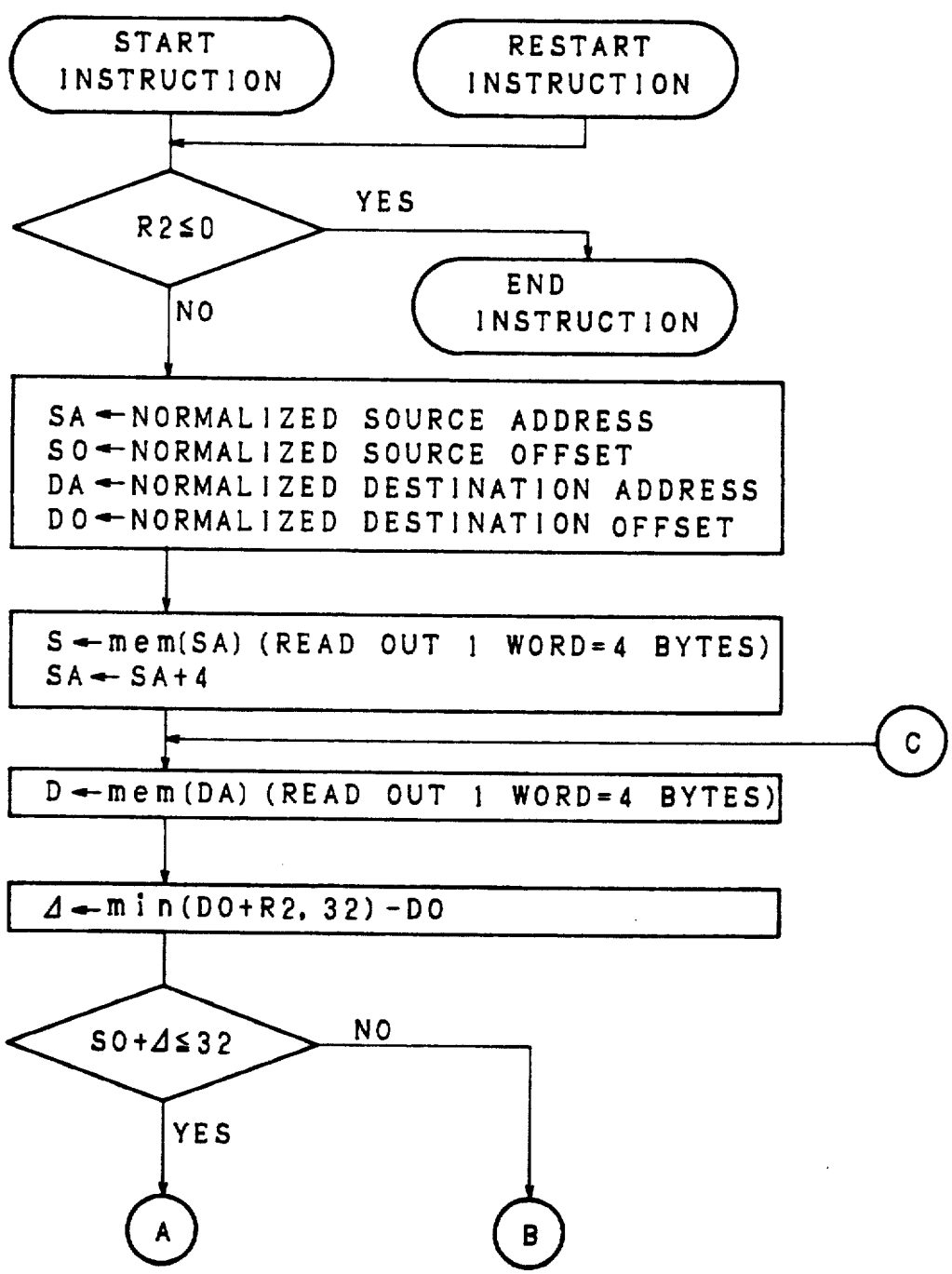
Figure 7:
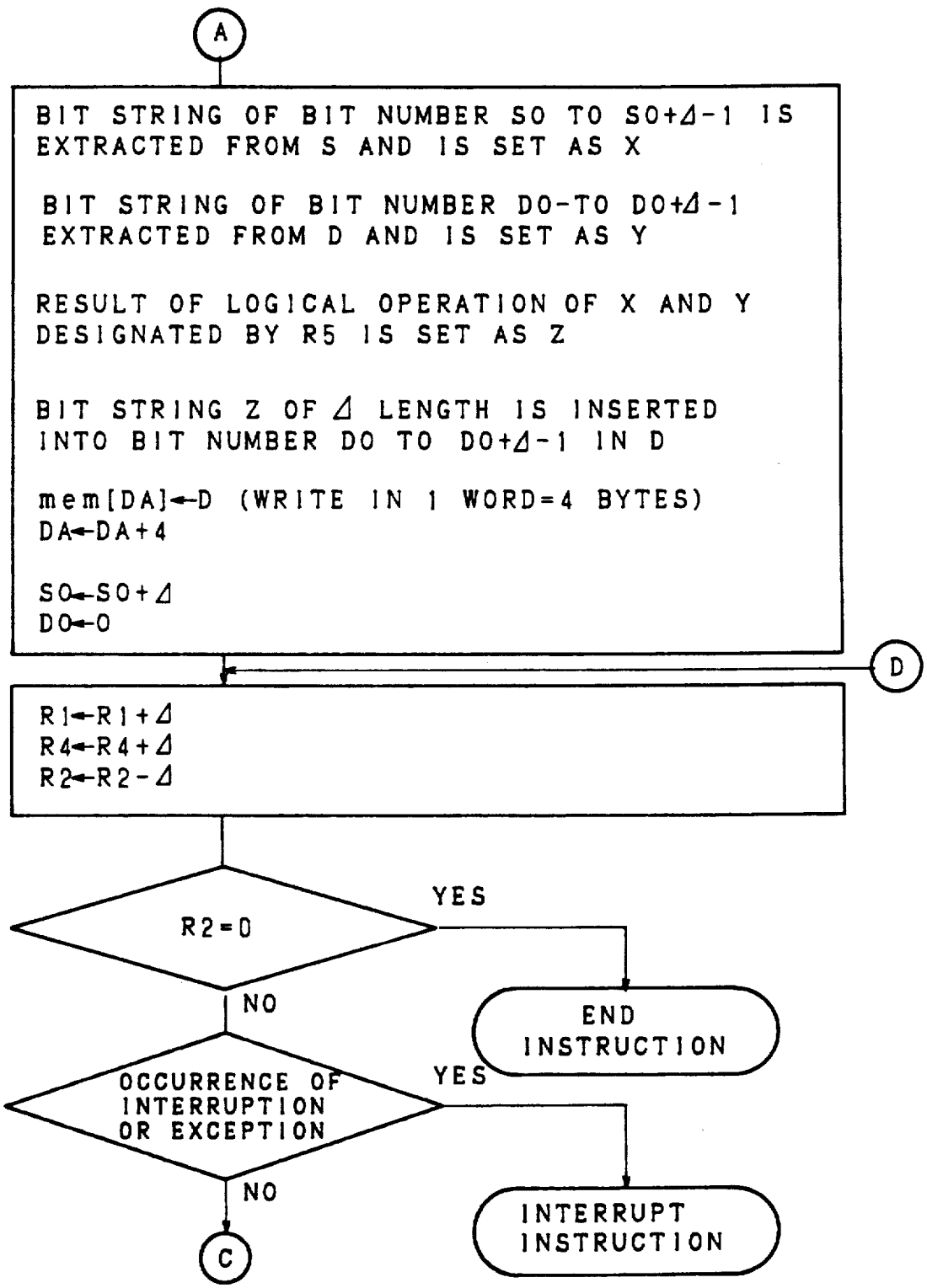
Figure 9:
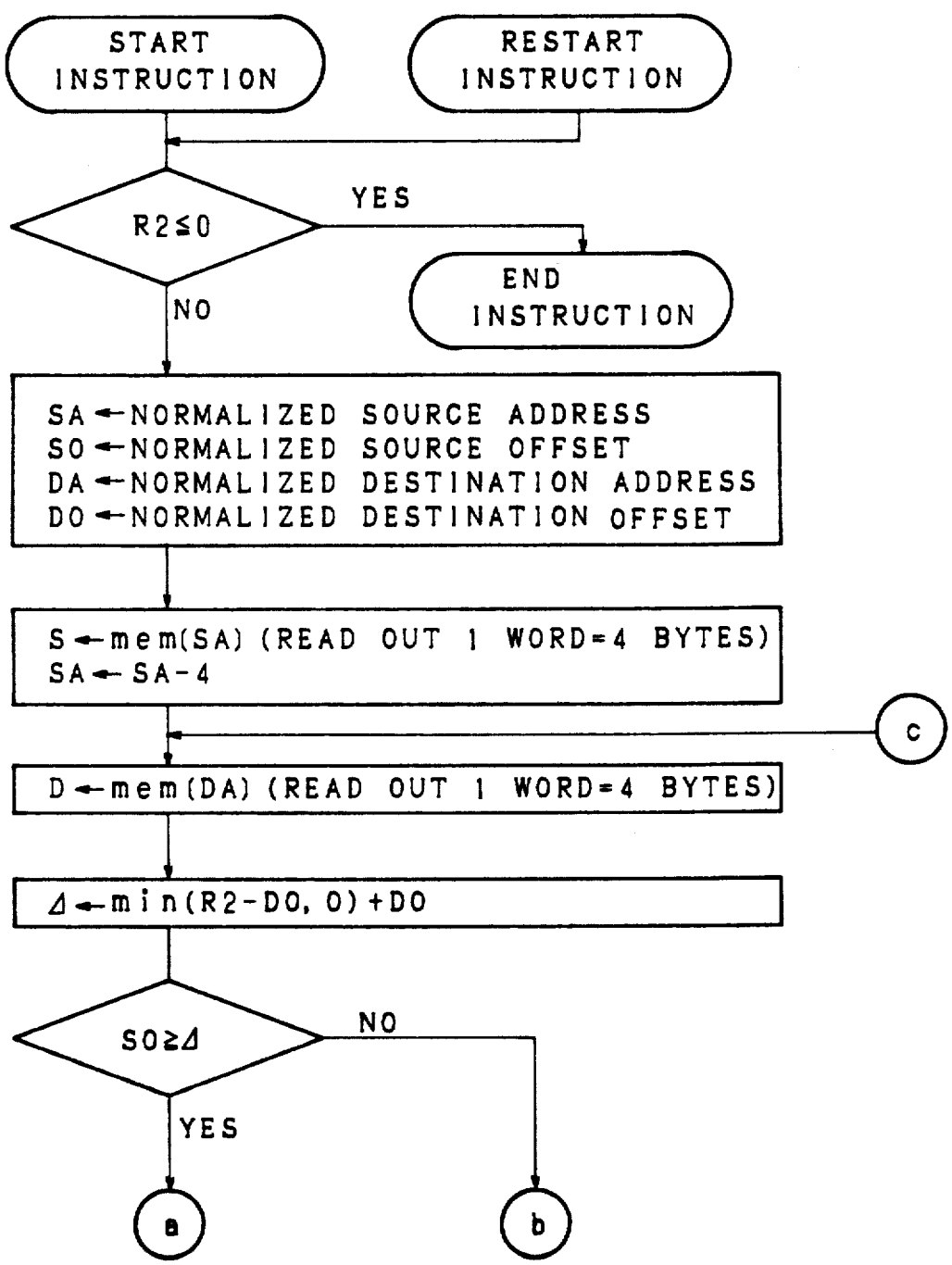
Figure 10:
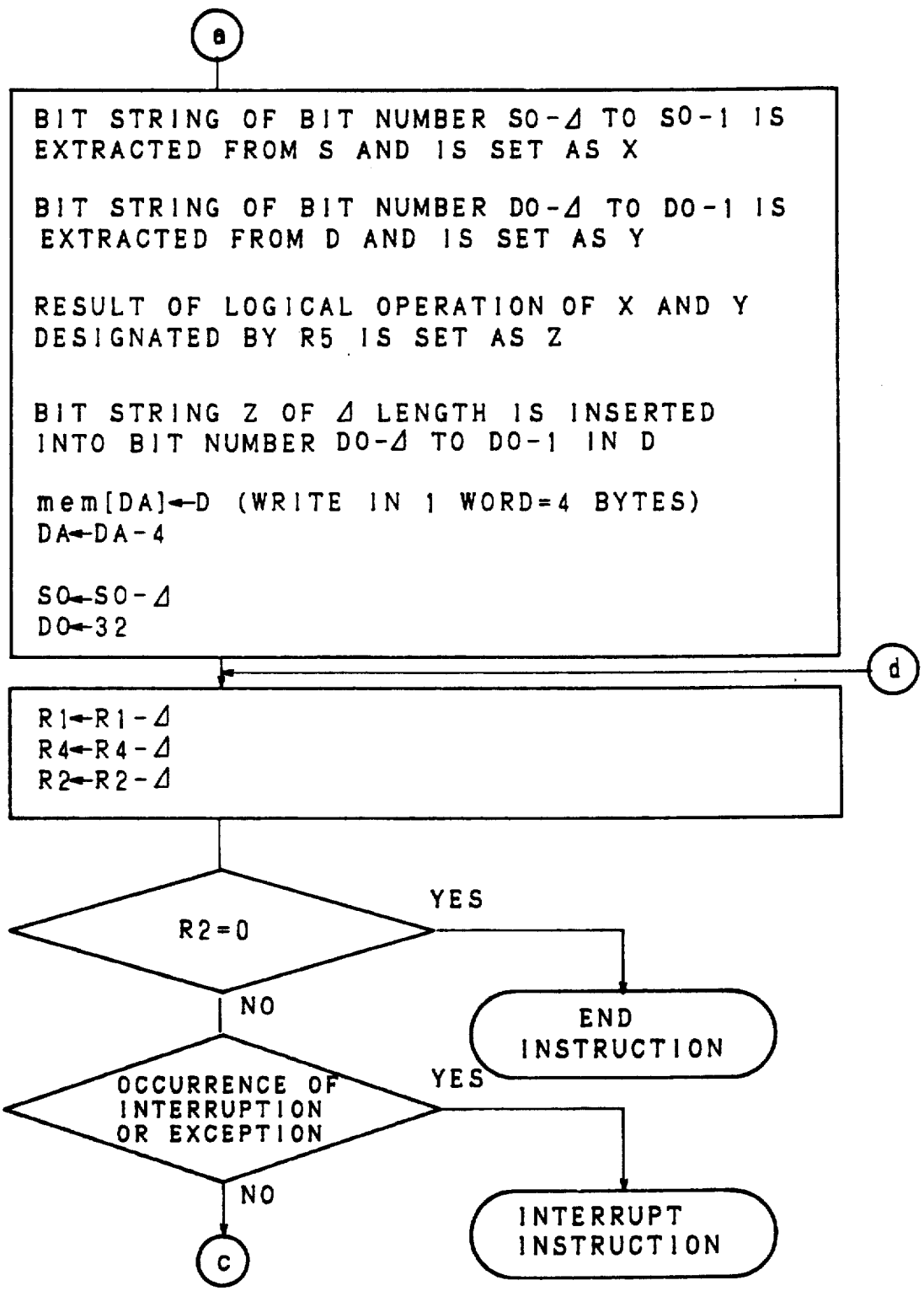

Among them, FIG. 6 through FIG. 8 are flowcharts in the case where processing of a bit field proceeds in the direction of increasing the bit number, and FIG. 9 through FIG. 11 are flowcharts in the case where processing of the bit field proceeds in the direction of decreasing the bit number.

Figure 12:
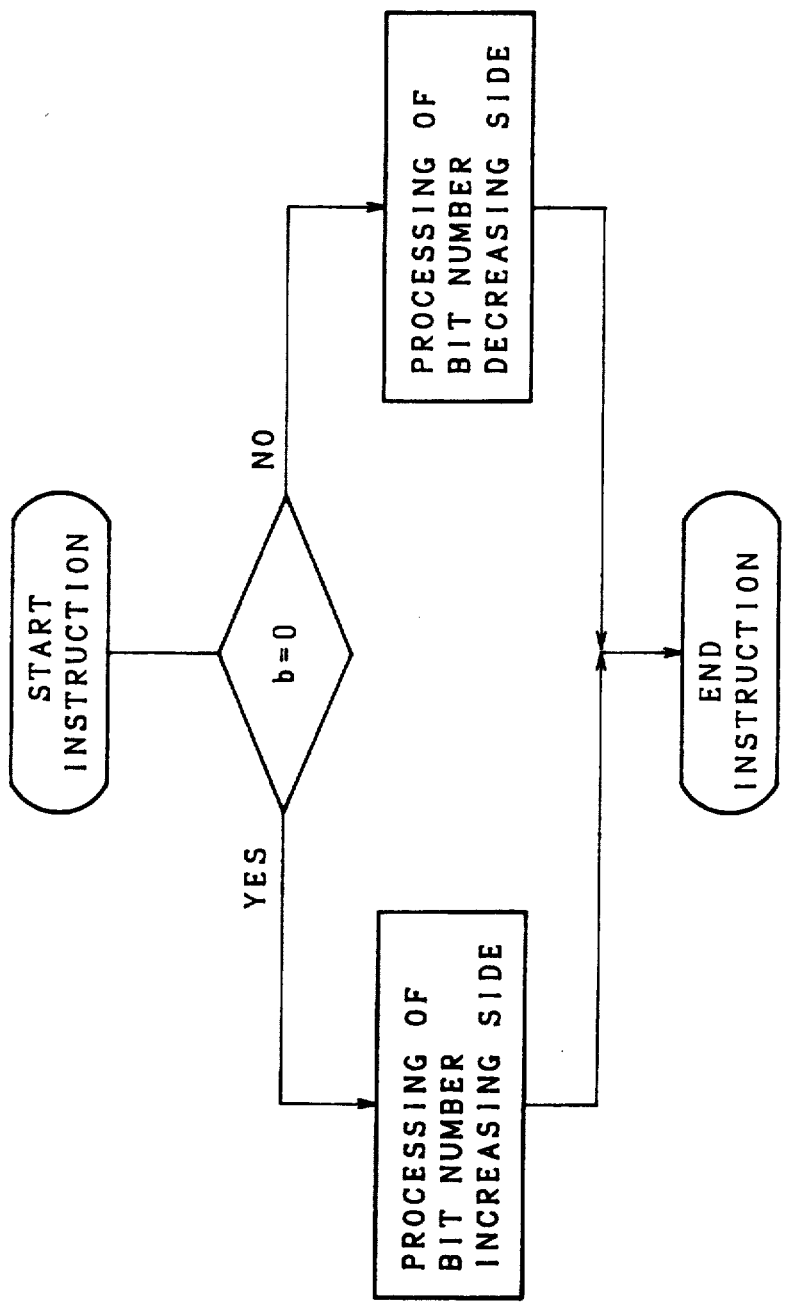
FIG. 12 is a flowchart showing another example of executing sequence of the BVMAP instruction.

FIG. 12 is a flowchart showing an execution sequence of the BVMAP instruction in another embodiment of the data processor in accordance with the present invention.

An operation code of the BVMAP instruction is fetched to the instruction fetch unit 1, thereafter being decoded in the instruction decode unit 1. At this time, the instruction decode unit 1 directs the instruction execution control unit 3 directs to select an microprogram entry which advances processing the bit field in the direction of increasing the bit number when the b bit 21 in the operation code is '0', and directs to select an microprogram entry which advances processing of the bit field in the direction of decreasing the bit number when the b bit 21 is '1'. When the microinstruction of the selected microprogram entry is outputted from the micro ROM 7, the instruction execution control unit 3 controls the instruction execution unit 5, and executes the BVMAP instruction.

First, description will be given on the execution sequence of the micro instruction in the case where processing of the bit field proceeds in the direction of increasing the bit number.

When an instruction is started, first, checking is made for whether or not the number of bits held in the R2 register 24 is negative. As a result, if the number is negative, it is unsuitable as an operand, and therefore the instruction is made to end at this point. On the other hand, if it is not negative, the next processing is executed, and the source address, source offset, destination address and destination offset are normalized, being made into SA, SO, DA and DO, respectively.

In addition, normalization in this case is to obtain an address of an aligned word including the most significant bit of the bit field and an offset value corresponding to that address. Specifically, the normalization of an address is realized in a manner that a quotient of offset divided by 8 is added to the address, and thereafter two low-order bits are converted into '0'. Also, the normalization of an offset is realized by obtaining a residue when the offset is divided by 32.

When the normalization is completed in such a manner, first, data of the first one word (=4 byte) of the source side is read-out. According to the value of SA, one word data is read-out from the memory 10 through the operand access unit 4, and this is set as S, being stored in one of the general purpose registers provided in the register file 11. Then, the value of SA is added by '4' to make into an address of data following the data now read.

Subsequently, the first one word (=4 bytes) data of the destination side is read-out. One word data of the value of DA is read-out from the memory 10 through the operand access unit 4, and this is stored as D in one of the general purpose registers provided in the register file 11.

Subsequently, the number of bits of the bit field contained in D is calculated. This can be evaluated in a manner that 'DO+R2' is compared with 32, and the smaller value is subtracted by DO. The evaluated value is stored as Δ in one of the general purpose registers in the register file 11.

Here, checking is made for whether or not the length of the bit field contained in S is smaller than Δ. When it is smaller, data following S must be read-out from the memory 10 to execute logical operation with the bit field in D. However, when the length of the bit field in S is larger than Δ, read-out from the memory 10 is not required, and therefore these processings must be executed separately. Then, SO is added by Δ, and if the result is 32 or less, it indicates that the length of the bit field contained in S is Δ or more, and processing proceeds to (A). On the other hand, in the case of SO+Δ>32, it shows that the length of the bit field in S is smaller than Δ, and processing branches to (B).

In the case (see FIG. 7) where processing proceeds to (A), logical operation designated by the R5 register 27 is executed for the read-out data of the source side and the data of the destination side, and the results thereof is rewritten to the location where D has been stored in the memory 10.

A bit string of bit numbers 'SO' to 'SO+Δ−1' in S is extracted and is set as X, and a bit string of bit numbers 'DO' to 'DO+Δ−1' in D is extracted and is set as Y, and they are stored in one of the general purpose registers in the register file 11, respectively. Logical operation designated by the R5 register 27 is executed for X and Y, and a bit string having a length Δ obtained as the result thereof is inserted into the bit numbers 'DO' to 'DO+Δ−1' in D, and the value of D is re-written to the location where D has been stored in the memory 10. Thereafter, the value of DA is added by '4' to indicated the address of data following D.

Also, the value of SO is added by the amount (=Δ) now processed to be set as source offset for a bit field not yet processed. Also, bit fields not yet processed of the destination side begin with the initial (bit number '0') of data following D, and therefore the value of DO is held set to 0.

On the other hand (see FIG. 8), when processing branches to (B), first, one word data following S is readout. Since the value of SA indicates an address of data following S in the preceding processing, one word is readout from the memory 10 using the value of SA, and this is stored as T in one of the general purpose registers in the register file 11. After reading-out it, the value of SA is added by 4 to indicate an address of data following T.

A bit string of bit numbers 'SO' to 'SO+Δ−1' is extracted from two word data obtained by coupling S and T, and is set as X, and a bit string of bit numbers 'DO' to 'DO+Δ−1' is extracted from D, and is set as Y, and they are stored in one of the general purpose registers in the register file 11.

Thereafter, logical operation is executed between X and Y likewise the processing (A), and the result thereof is rewritten to the location where D has been stored in the memory 10. Then, the value of DA is added by 4. If bit fields not yet processed still remain in T, they are used for the next processing, and therefore the value of T is transferred to S. Also, the value of SO is made into a source offset for the bit field not yet processed by adding 'Δ−32' thereto. The value of DO is set to '0', and processing returns to (D).

Here, to set offset values and the numbers of bits put in the R1 register 23, the R4 register 26 and the R2 register 24 as information for the bit fields not yet processed, the offset value has to be increased by the amount of processing, and the number of bits has to be decreased by the amount of processing. Accordingly, the R1 register 23 and the R4 register 26 are added by Δ, and the R2 register 24 is substracted by Δ.

At this time, when the value of the R2 register 24 becomes '0', it means that bit fields not yet processed are not left, and the instruction is made to end. If not '0', bit fields not yet processed are left, and therefore processing is continued.

Here, even if the instruction is interrupted, since the values of the R1 register 23, the R4 register 26 and the R2 register 24 has been updated, processing of bit fields not yet processed can be executed even if the execution of instruction is re-started after interruption. Accordingly, by providing a means for accepting an interrupt, exception or the like at this point, if an interrupt or exception is generated, processing corresponding thereto can be executed with the instruction interrupted. When the instruction is re-executed after completion of processing of interrupt or exception, the processing before the interruption of the instruction is executed successively. If no interrupt or exception is generated, processing returns to (C) and the sequence as described before is executed again, and this loop is repeated until the bit fields to be processed run out.

Next, description will be given on execute sequences of microinstruction in the case where processing of the bit field proceeds in the direction of decreasing the bit number in reference to FIG. 9 through FIG. 11.

Since the basic sequence is the same as the case where processing proceeds in the direction of increasing, simple description is made on others than different points.

When an instruction is started, checking is made for whether or not the number of bits held in the R2 register 24 is negative, and thereafter addresses and offsets of the source and the destination are normalized, respectively.

The first one word (=4 bytes) data of the source side is read-out from the memory 10, and this is set as S. Then, this case, the value of SA is substracted by '4' for processing in the direction of decreasing.

Subsequently, the first one word (=4 bytes) data of the destination side is read-out from the memory 10, being set as D.

Calculation of Δ is executed in a manner that 'R2-DO' and '0' are compared with each other and the one whichever smaller is added by 'DO'.

Hence, checking is made for whether or not the length of the bit field contained in S is smaller than Δ. If the result of the comparison of SO with Δ is 'SO≧Δ', it indicates that the length of the bit field in S is Δ or more, and processing proceeds to (a). On the other hand, if the result thereof is 'SO<Δ', it shows that the length of the bit field in S is smaller than Δ, and processing branches to (b).

When processing proceeds to (a), logical operation designated by the R5 register 27 is executed between the bit string X extracted from S and the bit string Y extracted from D, and the result thereof is written-in again to the location where D has been stored in the memory 10. At this time, the bit number of X in S becomes 'SO−Δ' to 'SO−1', the bit number of Y in D becomes 'DO−Δ to 'DO−1' and the result of operation is inserted into the bit numbers 'DO−Δ' to 'DO−1' in D. Thereafter, the value of DA is substracted by 4.

Also, the value of SO is taken as SO−Δ, being set as a source offset for the bit field not yet processed. Also, the bit field not yet processed of the destination side begins with the least significant bit (bit number '31') of data following D, and therefore the value of DO is set to 32.

On the other hand, when processing branches to (b), one word data following S is read, and this is set as T, and thereafter the value of SA is subtracted by 4 this time.

A bit string of the bit numbers '32+SO−Δ' to '32 +SO−1' is extracted from two word data obtained by coupling S and T, and is set as X, and a bit string of the bit numbers 'DO− Δ' to 'DO−1' is extracted from D, and is set as Y, and they are stored in one of the general purpose registers in the register file 11, respectively. Thereafter, logical operation is executed between X and Y, and the result thereof is re-written to the location where D has been stored in the memory 10. Then, the value of DA is substracted by 4. Also, the value of T is transferred to S, and thereafter the value of SO is set to '32+SO−Δ', and the value of DO is set to 32, and processing returns to (d).

For update of the R1 register 23, the R4 register 26 and the R2 register 24, processing is executed in the direction of decreasing the bit number, therefore the value of offset is decreased by the amount of processing. Accordingly, the R1 register 23 and the R4 register 26 are substracted by Δ. The R2 register 24 showing the length of bit field is substracted by Δ likewise the processing in the direction of increase.

At this time, if the value of R2 register 24 becomes 0, the instruction ends, and if not 0, processing is continued.

Then, at this point, an interrupt or exception is accepted, and if an interrupt or exception is generated, the instruction is interrupted and the corresponding processing is performed. After completing the processing, when re-execution of the instruction is performed, the processing before the interruption is executed successively. If no interrupt or exception is generated, processing returns to (c), and this loop is repeated until the bit fields to be processed run out.

The BVMAP instruction can be executed by the method as described above. Here, in decoding an operation code of the BVMAP instruction in the instruction decode unit 2, whether the processing is executed in the direction of increasing the bit number or in the direction of decrease is discriminated by the value of the b bit 21, and an entry of the microprogram corresponding to each case is designated. However, as another embodiment, as shown in FIG. 12, the BVMAP instruction can be executed by a method wherein, two kinds of processing methods are not discriminated in the instruction decode unit 2, and information of the b bit 21 is sent to the instruction execution control unit 3, and the microinstruction branches to the processing in the direction of increase in the bit number or to the processing in the direction of decrease according to information of that b bit 21.

As described above, in the data processor in accordance with the present invention, by providing the operation code designating the direction of bit processing, a correct operation of a bit string data can be performed even in the case where the read-out area of bit strings and the write-in area thereof overlap each other.

Furthermore, by representing the status of progress of operation of a bit string by an instruction by update of an operand in the register designating the bit string to be operated, interruption and re-start of execute processing of the instruction operating the bit string becomes possible, and unnecessary delaying of acceptance of an external interrupt can be dispensed with, and at the same time, execute restart of the instruction can be processed likewise the case of execute start of the instruction.

Furthermore, by performing processing of the bit string in matching with alignment of a bus, the capacity of the bus can be utilized to a maximum extent, and thereby the efficiency of execution of the instruction can be enhanced.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within the meets and bounds of the claims, or equivalence of such meets and bounds thereof are therefore intended to be embraced by the claims.

What is claimed is:

1. A data processor coupled to a memory addressed according to a word address indicating the location of a word of data in the memory consisting of a predetermined number of bits and a bit number indicating the location of a bit of data in a word, the data processor comprising:

a databus having a predetermined word width for transferring, in parallel, the predetermined number of bits in a word of data from the memory;

means, coupled to receive a bit string processing instruction that specifies the location in the memory of a starting bit of a bit string to be processed, that specifies a length value indicating the length of the bit string to be processed where the magnitude of the length value is greater than said predetermined number, and that specifies the type of processing to be performed on the bit string to be processed, for executing the received instruction to perform the specified type of processing on the bit string to be processed; and means, responsive to said received instruction, for processing said bit string in at least two kinds of order.

2. A data processor as set forth in claim 1, in which said two kinds of order are an order of each bit in said bit string from a lower bit address to a higher one and an order of each bit from a higher bit address to a lower one.

3. A data processor as set forth in claim 1, wherein either of said two kinds of order is designated by a field of at least one bit in an operation code of said instruction.

4. The data processor of claim 1 wherein the bit string processing instruction specifies the location of a destination bit string and the means for executing comprises:

means for performing a logical operation on said bit string to be processed and destination bit string specified by the bit string processing instruction.

5. In a data processor a system for executing a bit string processing instruction that specifies the location in a memory of a bit string to be processed and the type of processing to be preformed on the bit string to be processed, said system comprising:

- a micro ROM for storing a microinstruction program, starting at an entry point in the micro ROM, for executing the bit string processing instruction and including a first microinstruction subroutine, starting at a location in the micro ROM indicated by a first micro ROM address, and a second microinstruction interrupt handling subroutine;
- a decoder, connected to receive the bit string processing instruction, for decoding the received instruction to generate the entry address;
- first means for holding a first bit string address designating the location in memory of a boundary bit of the bit string to be processed;
- second means for holding an indication of the number of bits in the bit string to be processed;
- third means for holding a data word of predetermined length read from a word location in the memory, with said data word including a given number of bits included in said bit string starting at an arbitrary bit location in the data word;
- means, responsive to the entry address generated by the decoder, for accessing the microinstruction program;
- execution means, coupled to receive said first microinstruction subroutine from said micro ROM and to access the memory, for executing the first microinstruction subroutine to transfer a data word in memory from a word location in memory that includes the location in memory of the boundary bit designated by the bit string address held in said first means to said third means for holding, to process only said given number of bits in said data word held in said third means that are included in the bit string, and, if said given number is less than said number of bits in the bit string, to update the value of said bit string address held in said first means to designate the location in memory of a second boundary bit of the bits not yet processed in the bit string to be processed, to decrease the value of said indication, held in said second means, of the number of bits in said bit string by said given number to update said indication to indicate the number of bits not yet processed in said bit string, and to return to the first micro ROM address if the instruction is not interrupted or to branch to said second microinstruction subroutine if the instruction is interrupted, and for executing said second microinstruction subroutine if the instruction is interrupted to process the interrupt so that the second microinstruction interrupt handling subroutine is executed prior to processing the bits in the bit string not yet processed to prevent delays in servicing interrupts.

6. A method for executing a bit string instruction in a data processor coupled to memory to perform processing on a bit string stored in memory, said method comprising the steps of:

- holding a bit string address designating a location in memory of a bit string to be processed;
- holding an indication of the number of bits in the bit string to be processed;
- holding a data word of predetermined length read from a first word address in a memory, with said data word including a given number of bits included in said bit string starting at an arbitrary bit position in the data word;
- processing only said given number of bits in said data word that are included in the bit string;
- if said given number is less than said number of bits in the bit string, increasing the value of said bit string address by said given number to update said bit string address to indicate a first bit of a part of the bit string not yet processed;
- decreasing the value of said indication of the number of bits in said bit string by said given number to update said number to indicate a remaining number of bits not yet processed in said bit string; and
- processing an interrupt subsequent to updating said bit string address and said indication of the number of bits if the instruction is interrupted to prevent delays in servicing interrupts.

7. A method for executing a bit string processing instruction in a data processor coupled to a memory, with a given bit position in the memory addressed by a word address specifying a word location consisting of a predetermined number of bit positions, one of which is the given bit position and a bit number specifying which bit position in the word location is the given bit position, with the bit string processing instruction specifying an arbitrary bit position starting address, the length of a bit string stored in the memory, and the processing of the bit string, said method comprising the steps of:

- storing a bit string starting address number indicating the bit string bit position in memory where a first bit of the bit string is stored;
- storing a bit string length number indicating the number of bits in the bit string;
- utilizing said stored bit string starting address number to access and store a first word from a first word location in said memory that includes the bit string position of the first bit in the string with the first word comprising an included bits number of included bits that are part of the bit string, where the included bits number may be less than the predetermined number;
- determining a value of the included bits number;
- processing said included bits in said first word as specified by the instruction;
- increasing the value of the bit string starting address number stored in memory by the value of the included bits number to update the bits string address number to indicate an updated bit position of a first unprocessed bit in the string;
- decreasing the value of the string length number by the value of the included bits number to update the bit string length number to indicate an updated number of bits not yet processed in the bit string.

8. The method of executing the bit string processing instruction set forth in claim 7 further comprising the steps of:

- if an interrupt or an exception has occurred, executing interrupt processing if the bit string instruction is interrupted.

9. A method for executing a bit string processing instruction in a data processor coupled to a memory storing data including source and destination bit strings, with a given bit position in memory addressed by a word address of a word location consisting of a predetermined number of bit positions, one of which is the given bit position, and a bit number indicating which bit position in the word location is the given bit position, with the bit string processing instruction specifying a source starting address of a source bit string, a destination starting address of a destination bit string, the length of the bit strings, and the processing of the bit strings, said method comprising the step of:

storing a source bit string starting address number indicating a bit string position in memory where a first bit of the source bit string is stored;

storing a destination bit string starting address number indicating a bit string position in memory where a first bit of the destination bit string is stored;

storing a bit string length value indicating the number of bits in the bit string;

utilizing said stored source bit string starting address number to access and store a first source word from a first source word location in said memory that includes the bit position indicated by said source bit sting starting address;

utilizing said stored destination bit string starting address number to access and store a first destination word from a first destination word location in said memory that includes the bit position indicated by said destination bit string starting address;

determining a destination included bits number having a value being the number of bits in said stored first destination word that are included in the destination bit string, where the value of the destination included bits number may be less than the predetermined number if the destination bit string is not aligned with a boundary of the first destination word and indicates the number of bit positions in the first destination word that are included in the first destination word;

determining a source included bits number having a value being the number of bits in said first source word included in the source bit string determining a destination included bits number having a value being the number of bits in said stored first destination word that are included in the destination bit string, where the value of the source included bits number may be less than the predetermined number if the source bit string is not aligned with a boundary of the first source word and indicates the number of bit positions in the first source word that are included in the first source word;

if the value of the source included bit number is greater than the value of the destination included bit number, extracting only the destination included bits number of bits included in the source bit string from the first source word and extracting all the bits in the first destination word included in the destination bit string;

performing a logical operation, specified in the bit string processing instruction, of said extracted bits from said first destination and source words to form a processed destination bit field;

replacing the bits in said destination word that are included in the destination bit string with said processed destination bit field;

increasing the value of the source bit string starting address number by the value of the destination included bits number to update the source bit string address value to indicate the bit position in memory of a first bit of a part of the source bit string that is not yet processed;

increasing the value of the destination bit string starting address number by the value of the destination included bits number to update the destination bit string address number to indicate the bit position in memory of a first bit of a part of the source string that is not yet processed;

decreasing the value of the bit string length value by the value of the destination included bits number to update the bit string length value to indicate a number of bits not yet processed in the source and destination bit strings;

if the value of the source included bit number is less than the value of the destination included bits number, accessing and temporarily storing a second source word from a second source word location in memory immediately following said first source word location;

extracting only the destination included bits number of bits included in the source bit string from the first and second source words and extracting all the bits in the first destination word included in the destination bit string;

performing a logical operation, specified in the bit string processing instruction, of said extracted bits from said first destination and first and second source words to form a processed destination bit field;

replacing the bits in said destination word that are included in the destination bit string with said processed destination bit field;

increasing the value of the source bit string starting address stored in memory by a value of the sum of the predetermined number and the destinations included bits number to update the source bit string address to indicate the bit position of the first bit in the string that is not yet processed;

increasing the value of the destination bit string starting address stored in memory by the value of the destination included bits number to update the destination bit string address to indicate the bit position of the first bit in the string that is not yet processed; and decreasing the value of the bit string length value by the value of the destination included bits number to update the bit string length to indicate the number of bits in the string not yet processed.

10. A method for executing a bit string processing instruction in a data processor coupled to a memory storing data including source and destination bit strings with each bit string starting and ending at a boundary bit position in the memory, with a given bit position in memory addressed by a word address of a word location consisting of a predetermined number of bit positions, one of which is the given bit position, and a bit number indicating which bit position in the word location is the given bit position, with the bit string processing instruction specifying a source starting address of a source bit string, a destination starting address of a destination bit string, the length of the bit strings, and the processing of the bit string, said method comprising the step of:

storing a source bit string starting address number indicating a bit string position in memory where a boundary bit of the source bit string is stored;

storing a destination bit string starting address number indicating a bit string position in memory where a boundary bit of the destination bit string is stored;

storing a bit string length value indicating the number of bits in the bit string;

utilizing said stored source bit string starting address number to access and store a first source word from a first source word location in said memory that includes the bit position indicated by said source bit string starting address;

utilizing said stored destination bit string starting address number to access and store a first destination word from a first destination word location in said memory that includes the bit position indicated by said destination bit string starting address;

determining a destination included bits number having a value being the number of bits in said stored first destination word that are included in the destination bit string, where the value of the destination included bits number may be less than the predetermined number if the destination bit string is not aligned with a boundary of the first destination word and indicates the number of bit positions in the first destination word that are included in the first destination word;

determining a source included bits number having a value being the number of bits in said first source word included in the source bit string determining a destination included bits number having a value being the number of bits in said stored first destination word that are included in the destination bit string, where the value of the source included bits number may be less than the predetermined number if the source bit string is not aligned with a boundary of the first source word and indicates the number of bit positions in the first source word that are included in the first source word;

if the value of the source included bits number is greater than the value of the destination included bits number, extracting only the destination included bits number of bits included in the source bit string from the first source word and extracting all the bits in the first destination word included in the destination bit string;

performing a logical operation, specified in the bit string processing instruction, of said extracted bits from said first destination and source words to form a processed destination bit field;

replacing the bits in said destination word that are included in the destination bit string with said processed destination bit field;

changing the value of the source bit string starting address number by the value of the destination included bits number to update the source bit string address number to indicate a bit position in memory of the boundary bit of a part of the source bit string that is not yet processed;

changing the value of the destination bit string starting address number by the value of the destination included bits number to update the destination bit string address number to indicate a bit position in memory of the boundary bit of a part of the source bit string that is not yet processed;

decreasing the value of the bit string length value by the value of the destination included bits number to update the bit string length value to indicate a number of bits not yet processed in the source and destination bit strings;

if the value of the source included bits number is less than the value of the destination included bits number, accessing and temporarily storing a second source word from a second source word location in memory immediately adjacent to said first source word location;

extracting only the destination included bits number of bits included in the source bit string from the first and second source words and extracting all the bits in the first destination word included in the destination bit string;

performing a logical operation, specified in the bit string processing instruction, of said extracted bits from said first destination and first and second source words to form a processed destination bit field;

replacing the bits in said destination word that are included in the destination bit string with said processed destination bit field;

changing the value of the source bit string starting address stored in memory by a value of the sum of the predetermined number and the destinations included bits number to update the source bit string address to indicate a bit position of the boundary bit of a part of the string that is not yet processed;

changing the value of the destination bit string starting address stored in memory by the value of the destination included bits number to update the destination bit address to indicate a bit position of the boundary bit of a part of the string that is not yet processed; and decreasing the value of the bit string length value by the value of the destination included bits number to update the bit string length to indicate the number of bits not yet processed in the string.

11. The method of claim 10 wherein the bit processing instruction includes an indication of the direction of processing and further including the steps of:

if processing is to proceed in a forward direction:
selecting said boundary bits to be the first bit of said source and destination bit fields; and
wherein said step of changing the value of the source and destination starting address numbers comprises increasing said numbers;

if processing is to proceed in a backward direction:
selecting said boundary bits to be the last bit of said source and destination bit fields; and
wherein said step of changing the value of the source and destination starting address numbers comprises decreasing said numbers.

12. A method for executing a bit string processing instruction in a data processor coupled to a memory having storing data including source and destination bit strings with each bit string starting and ending at a boundary bit position in memory, with a given bit position in memory addressed by a word address of a word location consisting of a predetermined number of bit positions, one of which is the given bit position, and a bit number indicating which bit position in the word location is the given bit position, with the bit string processing instruction specifying a source starting address of a source bit string, a destination starting address of a destination bit string, the length of the bit strings, and the processing of the bit string, said method comprising the step of:

storing a source bit string starting address number indicating a bit string position in memory where a boundary bit of the source bit string is stored;

storing a destination bit string starting address number indicating a bit string position in memory where a boundary bit of the destination bit string is stored;

storing a bit string length value indicating the number of bits in the bit string;

utilizing said stored source bit string starting address number to access and store a first source word from a first source word location in said memory that includes the bit position indicated by said source bit string starting address;

utilizing said stored destination bit string starting address number to access and store a first destination word from a first destination word location in said memory that includes the bit position indicated by said destination bit starting address;

determining a destination included bits number having a value being the number of bits in said stored first destination word that are included in the destination bit string, where the value of the destination included bits number may be less than the predetermined number if the destination bit string is not aligned with a boundary of the first destination word and indicates the number of bit positions in the first destination word that are included in the first destination word;

determining a source inluded bits number having a value being the number of bits in said first source word included in the source bit string determining a destination included bits number having a value being the number of bits in said stored first destination word that are included in the destination bit string, where the value of the source included bits number may be less than the predetermined number if the source bit string is not aligned with a boundary of the first source word and indicates the number of bit positions in the first source word that are included in the first source word:

if the value of the source included bits number is greater than the value of the destination included bits number, extracting only the destination included bits number 0 bits included in the source bit string from the first source word ;

replacing the bits in said destination word that are included in the destination bit string the bits extracted from said first source word;

changing the value of the source bit string starting address number by the value of the destination included bits number to update the source bit string address number to indicate a bit position in memory of the boundary bit of a part of the source bit string that is not yet processed;

changing the value of the destination bit string starting address number by the value of the destination included bits number to update the destination bit string address number to indicate a bit position in memory of the boundary bit of a part of the source bit string that is not yet processed;

decreasing the value of the bit string length value by the value of the destination included bits number to update the bit string length value to indicate the number of bits not yet processed in the source and destination bit strings;

if the value of the source included bits number is less than the value of the destination included bits number, accessing and temporarily storing a second source word from a second source word location in memory including bits in the source bit string and immediately adjacent to said first source word location;

extracting only the destination included bits number of bits included in the source bit string from the first and second source words;

replacing the bits in said destination word that are included in the destination bit string with the bits extracted from said first and second source words;

changing the value of the source bit string starting address stored in memory by the value sum of the predetermined number and the destinations included bits number to update the source bit string address to indicate a bit position of the boundary bit of a part of the string that is not yet processed;

changing the value of the destination bit string starting address stored in memory by the value of the destination included bits number to update the destination bit string address to indicate a bit position of the boundary bit of a part of the string that is not yet processed; and decreasing the value of the bit string length value by the value of the destination included bits number to update the bit string length to indicate the number of bits not yet processed in the string.

13. The method of claim 12 wherein the bit processing instruction includes an indication of the direction of processing and further including the steps of:

if processing is to proceed in a forward direction:

selecting said boundary bits to be the first bit of said source and destination bit fields; and wherein said step of changing the value of the source and destination starting address numbers comprises increasing said numbers;

if processing is to proceed in a backward direction:

selecting said boundary bits to be the last bit of said source and destination bit fields; and wherein said step of changing the value of the source and destination stating address numbers comprises decreasing said numbers.

14. A method for executing a bit string processing instruction in a data processor coupled to a memory having each bit location addressed by a word address specifying a word location of a predetermined width and by a bit number indicating a bit position in the word, with the bit processing instruction specifying an arbitrary source bit position in memory of a boundary bit of a bit string read-out area in memory, specifying an arbitrary destination bit position location in memory of a boundary bit of a bit string write-in area in memory, and specifying a bit string length number indicating the length of the bit string read-out area and the bit string write-in area, with the read-in area and the write-in area starting and ending at bit string boundary bit positions in memory and with each word location starting and ending at word boundary bit positions, said method comprising the steps of:

sequentially accessing successive word locations that included bit positions in said read-out area of said memory only once when the bit string length number is greater than said predetermined number of bit in a word and bit string boundary bit position is not a word boundary bit position;

executing the specified processing on bits, included in each accessed word, that are accessed from bit locations in said read-out area of the memory to form a processed bit string; and sequentially writing the bits of said processed bit string to the bit positions in the write-in area of the memory.

15. The method of claim 14 further comprising the steps of:
performing interrupt processing after accessing a given one of the successive word locations in memory if the bit string processing instruction is interrupted.

16. The method of claim 14 further comprising the step of:
first accessing a beginning word of the successive word locations in memory that has a lowest word address value of any of the successive word locations if the bit string processing instruction indicates that processing is to proceed in a first type of order; and
first accessing an ending word of the successive word locations in memory that has a highest word address value of any of the successive word locations if the bit string processing instruction indicates that processing is to proceed in a second type of order.

17. A data processor including a plurality of registers having a fixed register width and coupled to a memory addressed according to a word address indicating the location of a word of data in the memory consisting of a predetermined number of bits and a bit number indicating the location of a bit of data in a word, the data processor comprising:
a databus having a predetermined word width for transferring, in parallel, the predetermined number of bits in a word of data from the memory;
means, coupled to receive a bit string processing instruction, that specifies the location in the memory of a starting bit of a bit string to be processed, that specifies a length value indicating the length of the bit string to be processed where the magnitude of the length value is greater than the fixed register width, and that specifies the type of processing to be performed on the bit string to be processed, for executing the received instruction to perform the specified type of processing on the bit string to be processed; and
means, responsive to said received instruction, for processing said bit string in at least two kinds of order.

18. A data processor coupled to a memory addressed according to a word address indicating the location of a word of data in the memory consisting of a predetermined number of bits and a bit number indicating the location of a bit of data in a word, the data processor comprising:
a databus having a predetermined word width for transferring, in parallel, the predetermined number of bits in a word of data from the memory;
means, coupled to receive a bit string processing instruction that specifies the location in the memory of a starting bit of a bit string to be processed, where the bit number of the specified location has a value between zero and the predetermined number, that specifies a length value indicating the length of the bit string to be processed where the magnitude of the length value is greater than the databus width, and that specifies the type of processing to be performed on the bit string to be processed, for executing the received instruction to perform the specified type of processing on the bit string to be processed; and
means, responsive to said received instruction, for processing said bit string in at least two kinds of order.

* * * * *

UNITED STATES PATENT AND TRADEMARK OFFICE
CERTIFICATE OF CORRECTION

PATENT NO. : 5,121,474

DATED : June 9, 1992

INVENTOR(S) : Sakamura et al

Page 1 of 2

It is certified that error appears in the above—identified patent and that said Letters Patent is hereby corrected as shown below:

Col. 2, line 50, "form" should be --from--.

Col. 2, line 55, "accesss" should be --access--.

Col. 2, line 58, "but" should be --bus--.

Col. 3, line 10, "bit" should be --bits--.

Col. 3, line 12, "numberal" should be --numeral--.

Col. 3, line 40, "numer" should be --number--.

Col. 3, line 63, "dedsignated" should be --designated--.

Col. 4, lines 26 and 29, "an" should be --a--.

Col. 6, line 37, "microinstruction" should be --microinstructions--.

Col. 7, lines 27 and 28, "substracted" should be --subtracted--.

Col. 8, line 26, "illustractive" should be --illustrative--.

Col. 9, line 7, "preformed" should be --performed--.

Col. 10, line 54, --and-- should appear after "string;".

Col. 11, line 23, "sting" should be --string--.

Col. 12, line 7, --bit-- should appear before "string".

UNITED STATES PATENT AND TRADEMARK OFFICE
CERTIFICATE OF CORRECTION

PATENT NO. : 5,121,474
DATED : June 9, 1992
INVENTOR(S) : Sakamura et al

It is certified that error appears in the above-indentified patent and that said Letters Patent is hereby corrected as shown below:

Col. 14, line 29, --string-- should appear after "bit".

Col. 15, line 16, --string-- should be inserted after "bit".

Col. 15, line 27, "inluded" should be --included--.

Col. 15, line 41, --of-- should appear after "number" and the zero ("0") before "bits" should be deleted.

Signed and Sealed this

Twelfth Day of October, 1993

Attest:

BRUCE LEHMAN

*Attesting Officer*   *Commissioner of Patents and Trademarks*